May 20, 1941. L. G. HILKEMEIER 2,243,035
REVERSIBLE POWER TRANSMISSION
Filed April 11, 1939
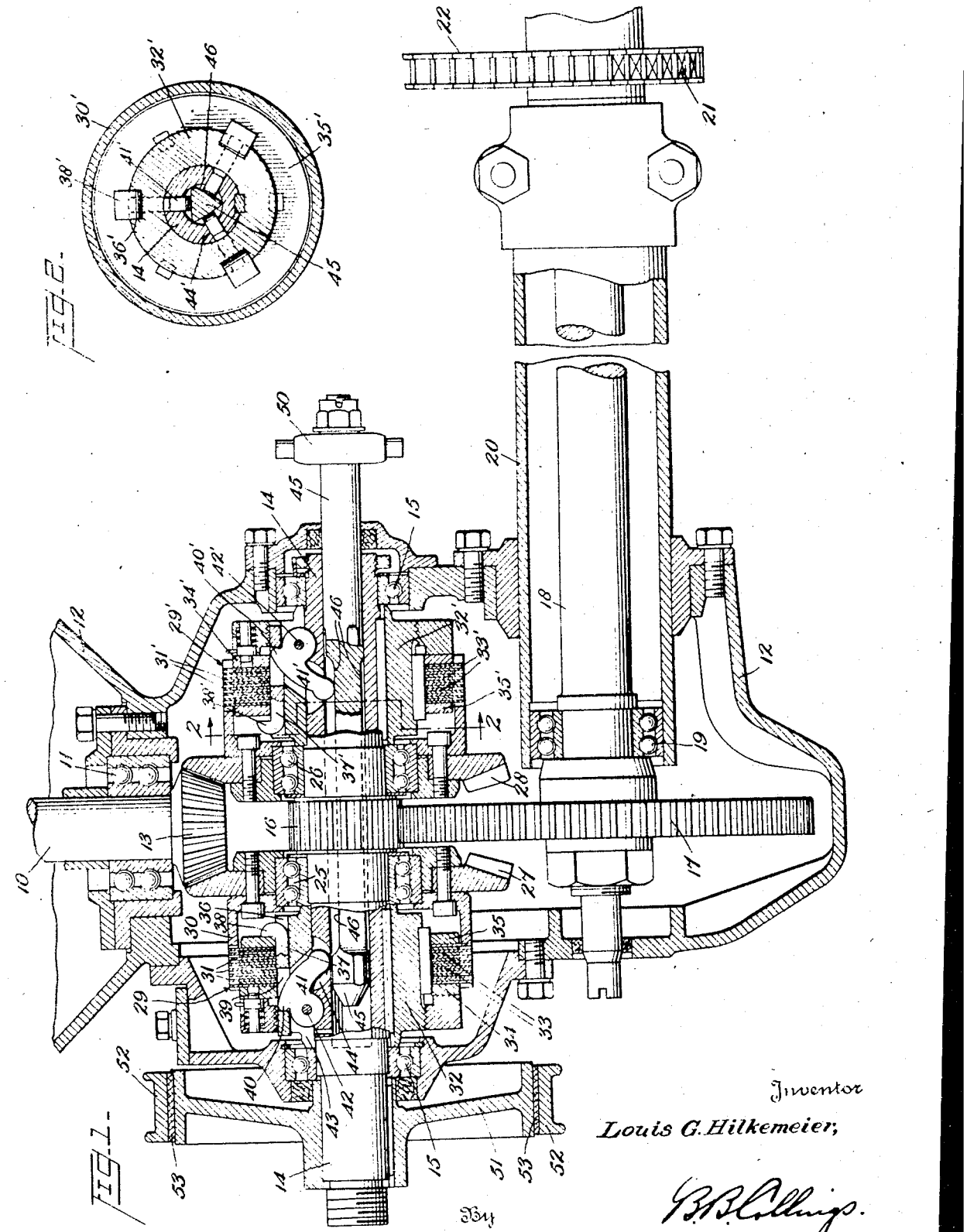
Inventor
Louis G. Hilkemeier,
By
B. B. Collings.
Attorney Patented May 20, 1941

2,243,035

UNITED STATES PATENT OFFICE 2,243,035

REVERSIBLE POWER TRANSMISSION

Louis G. Hilkemeier, Milwaukee, Wis., assignor to Chain Belt Company, Milwaukee, Wis., a corporation of Wisconsin Application April 11, 1939, Serial No. 267,284

2 Claims. (Cl. 192—69)

The invention relates to reversible power transmissions, and has for one of its objects to provide a device of this character which is especially adapted for heavy duty, as for example in driving the drums of concrete mixers of the type disclosed in the prior U. S. Patent No. 1,781,965 granted November 18, 1930, on an application filed by Charles F. Ball.

A further object of the invention is to provide a reversible transmission in which the gears are always in mesh, and have associated with them friction clutches, preferably although not necessarily of the disc type, whereby the load may be picked up quietly, smoothly and efficiently in either direction of drive.

A still further object of the invention is to provide a combined reversing and reduction gearing, comprising essentially a driving shaft with a bevel drive pinion thereon; a hollow clutch shaft having a spur pinion thereon adapted to drive a gear upon a driven shaft; a pair of bevel gears journalled on the clutch shaft, constantly meshing with opposite sides of the drive pinion, whereby they are constantly rotated in opposite directions; a friction clutch associated with each of said bevel gears, the driven elements of which are mounted by clutch hubs rigidly secured on said clutch shaft; and actuating fingers for said clutches mounted by each clutch hub and arranged to extend through apertures in the wall of said hollow clutch shaft for engagement by an axial actuating pin or rod slidably mounted in said hollow clutch shaft, and extending to the exterior of the gear housing for operation by external means. The actuating pin is so constructed and arranged as to cause engagement of only one clutch at a given instant, the other clutch being held disengaged so that only one of said bevel gears will be clutched to the clutch shaft at a time.

With the above and other objects in view which will appear as the description proceeds, the invention consists in the novel details of construction and combinations and arrangements of parts more fully hereinafter described and particularly pointed out in the appended claims.

Referring to the accompanying drawing forming a part of this specification, in which like reference characters designate like parts in all the views—

Figure 1 is a horizontal sectional view, with certain of the parts in plan, of one form of reversing and reducing gearing constructed in accordance with the invention; and Fig. 2 is a transverse sectional view, taken approximately on the plane indicated by the line 2—2, of Fig. 1, looking in the direction of the arrows.

Referring more particularly to the said drawing, 10 indicates a drive shaft, which may be driven by the crank shaft of an internal combustion engine or other suitable motor, which shaft 10 is journalled by means of an anti-friction bearing 11 in a housing 12 and carries a bevel drive pinion 13. A hollow clutch shaft 14 is also journalled in the said casing 12 in a plane transverse to that of the drive shaft 10 being preferably mounted in suitable anti-friction bearings 15. The said clutch shaft 14 carries a spur pinion 16 integrally formed with or rigidly connected to the medial portion thereof, which pinion meshes with a reduction spur gear 17 mounted upon a driven shaft 18 journalled by suitable anti-friction bearings 19 in a tubular housing 20 which extends into and is supported at one end by the housing 12. The said driven shaft 18 may also be provided with a sprocket 21 about which passes a chain 22 which transmits power to the concrete mixer drum or other driven element.

Journalled upon the hollow clutch shaft 14 by suitable anti-friction bearings 25 and 26 to either side of the pinion 16 is a pair of bevel gears 27 and 28 which are in constant mesh with the opposite sides of the drive pinion 13. The gear 27 has associated with it a friction clutch 29 comprising a drum member 30 rigidly secured to the said gear and which carries one or more friction clutch discs or elements 31. A clutch hub 32 is keyed or otherwise rigidly secured to the clutch shaft 14 within the clutch drum 30 and carries one or more companion friction clutch discs or elements 33 arranged in cooperative relation with the driving elements 31 in the well known manner. An abutment ring 34 is mounted upon the hub 32 at one end of the disc assembly, and a pressure ring 35 is slidably mounted on the said hub at the other end of the disc assembly. The clutch hub 32 is provided with a plurality of longitudinal key-ways 36 upon its exterior surface, in each of which is mounted a slidable key 37 having a head 38 engaging with the pressure ring 35 and the said keys are further provided in their body portion with apertures 39 into which extend the actuating tips 40 of suitable clutch actuating fingers 41 which are pivoted as at 42 in recesses 43 formed in the hub 32. The clutch fingers 41 extend through longitudinally spaced apertures 44 through the wall of the hollow clutch shaft 14 and their inner ends are arranged to be engaged by an actuating pin or rod 45 which is slidably mounted within the said hollow clutch shaft 14, as will be readily understood from the drawing.

The bevel gear 28 has a similar friction clutch 29' associated with it the details of which are identical with the clutch 29 and the corresponding parts of which have been designated by corresponding primed reference characters.

The actuating rod or pin 45 is cut away as at 46 to form recesses in the actuating surfaces for the clutch fingers 41 and 41', the construction preferably being such that before either clutch is engaged the other one will be disengaged. That is to say, as shown in Fig. 1, the pin or rod 45 is in such position that the clutch fingers 41 have been moved about their pivots 42 to cause the actuating tips 40 of said fingers to move the sliding keys 37 toward the left, as seen in the said figure, thereby causing the heads 38 of the said keys to exert pressure upon the pressure ring 35 and force the friction discs or plates 31 and 33 into power transmitting engagement whereby power from the constantly rotating gear 27 will be transmitted to the hollow clutch shaft 14, the pinion 16, the gear 17 and driven shaft 18 and the sprocket 21 and chain 22 carried thereby.

At this time the clutch fingers 41' have entered the recessed portion 46 of the actuating pin or rod 45 so that they have relieved pressure upon the sliding keys 37' and the clutch discs or plates 31' and 33' have been separated by clutch release springs, not shown, but of usual construction, so that no power will be transmitted from the bevel gear 28 to the clutch shaft 14 and driven shaft 18. In other words, the gear 28 is merely revolving freely on its bearings 26 without transmitting power to the said shafts.

Any suitable actuating means may be employed to shift the actuating pin 45 axially within the hollow clutch shaft 14 by means of the shifting collar 50, and when the said pin 45 is shifted toward the left as viewed in Fig. 1 by such means the fingers 41 of the clutch 29 will first enter the cut away portions 46 of the pin thereby releasing the said clutch 29 and stopping the drive, and upon further movement of the pin 45 toward the left the fingers 41' will leave the cut away portions 46 of the rod 45 and cause engagement of the discs of the clutch 29' to connect the opposite rotating gear 28 with the clutch shaft 14. The construction is preferably such that during the shift both clutches will be fully disengaged thereby providing a neutral point at which power will not be transmitted from either of the gears 27 or 28 to the clutch shaft 14.

The clutch shaft 14 may be provided, if desired, with a brake drum 51 having associated with it suitable brake shoes 52 provided with brake lining 53 engageable at will with the said brake drum 51, whereby the driven parts may be positively held against rotation when the actuating pin 45 is in the said neutral position. By application of suitable control mechanism, the particular form of which is not shown, the application of the brake may be automatically controlled by the position of the actuating pin 45 and the shifting collar 50, and when so controlled the clutch surfaces will be relieved against excessive wear during reversal of rotation of the driven shaft.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. Clutch mechanism for a power transmission having a closed housing, said mechanism comprising a tubular shaft journaled in said housing and terminating at one end within the latter, said shaft having longitudinally spaced apertures in its side wall; a pair of driving elements for said shaft, one element arranged to drive it in one direction and the other element in the opposite direction; a clutch element carried by each of said driving elements; a complementary driven clutch element carried by the shaft in co-operative relation to each of said driving clutch elements, said driven clutch elements including hubs fixedly secured to said shaft against both circumferential and longitudinal movements relative thereto; actuating fingers for controlling the power-transmitting engagement of each pair of complementary clutch elements, said fingers being pivotally mounted in said hubs adjacent the apertures in said shaft wall and extending therethrough into the shaft bore; an axial rod longitudinally slidably mounted in said shaft bore and extending from the end of the shaft within the housing through an end wall of the latter, said rod having cam surfaces thereon coacting with the inner ends of said fingers to cause engagement of either pair of complementary clutch elements and concurrent disengagement of the other pair; and means connected to the projecting end of said rod exterior of the housing for reciprocating it within the shaft bore.

2. Clutch mechanism for a power transmission, comprising a tubular shaft having longitudinally spaced apertures in its side wall; a pair of oppositely rotating driving elements for said shaft; a pair of clutch hubs carried by said shaft, one adjacent each of said driving elements; driving friction clutch members carried by each of said driving elements; driven friction clutch members carried by each of said clutch hubs in co-operative association with the respective driving clutch members; sliding keys carried by said hubs for moving said clutch members into co-operative engagement; clutch fingers pivotally carried by said hubs, having portions engaging said keys and other portions extending through the apertures in said clutch shaft into the bore thereof; an axial rod longitudinally slidably mounted in the bore of said shaft and extending beyond an end of the latter, said rod having portions engageable with said clutch fingers to cause engagement of either of said clutches and concurrent disengagement of the other clutch; and means connected to the projecting end of said axial rod for reciprocating it within the shaft bore.

LOUIS G. HILKEMEIER.